(12) United States Patent
Boxey

(10) Patent No.: US 8,016,066 B1
(45) Date of Patent: Sep. 13, 2011

(54) PEDESTRIAN AIR BAG

(75) Inventor: Kevin J. Boxey, Columbiaville, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 12/797,931

(22) Filed: Jun. 10, 2010

(51) Int. Cl.
*B60D 1/28* (2006.01)

(52) U.S. Cl. ........................... 180/271; 180/274

(58) Field of Classification Search .............. 280/271, 280/274, 730.1, 743.2
See application file for complete search history.

(56) References Cited

U.S. PATENT DOCUMENTS

| | | | |
|---|---|---|---|
| 6,668,962 B2 * | 12/2003 | Son | 180/274 |
| 6,955,238 B2 * | 10/2005 | Takimoto | 180/274 |
| 7,410,027 B2 * | 8/2008 | Howard | 180/274 |
| 7,828,319 B2 * | 11/2010 | Takimoto | 280/730.1 |
| 2003/0159875 A1 | 8/2003 | Sato et al. | |
| 2003/0178239 A1 * | 9/2003 | Takimoto | 180/274 |
| 2003/0192731 A1 | 10/2003 | Kikuchi et al. | |
| 2004/0074688 A1 | 4/2004 | Hashimoto et al. | |
| 2005/0257979 A1 * | 11/2005 | Hamada et al. | 180/274 |
| 2006/0175115 A1 * | 8/2006 | Howard | 180/274 |
| 2009/0014988 A1 * | 1/2009 | Takimoto et al. | 280/730.1 |
| 2009/0102167 A1 | 4/2009 | Kitte et al. | |
| 2009/0120708 A1 * | 5/2009 | Takimoto | 180/274 |

FOREIGN PATENT DOCUMENTS

| | | | |
|---|---|---|---|
| JP | 2003063334 A | * | 3/2003 |
| JP | 2003276537 A | * | 10/2003 |
| JP | 2007152967 A | * | 6/2007 |
| WO | 02079009 | | 10/2002 |
| WO | 2007083537 | | 7/2007 |

* cited by examiner

*Primary Examiner* — Faye M. Fleming
(74) *Attorney, Agent, or Firm* — Tarolli, Sundheim, Covell & Tummino LLP

(57) ABSTRACT

An apparatus (10) helps to protect a pedestrian from impacts with a vehicle (12) that has a windshield (24) and a hood (32) covering an engine compartment (30). The apparatus (10) includes an air bag (14) that is inflatable away from the engine compartment (30) through a space (342) between the hood (32) and the windshield (24) from a stored condition to a deployed condition positioned adjacent the windshield (24). A housing (60) stores the air bag (14) in a deflated and stowed condition in the engine compartment (30). A deflector (260) has a portion connected to the housing (60) and a portion for being connected to the vehicle hood (32). The deflector (260) is adapted to deflect the air bag (14) during inflation and direct the air bag (14) to clear the vehicle hood (32) and to deploy through the space (342) between the hood (32) and the windshield (24).

18 Claims, 10 Drawing Sheets

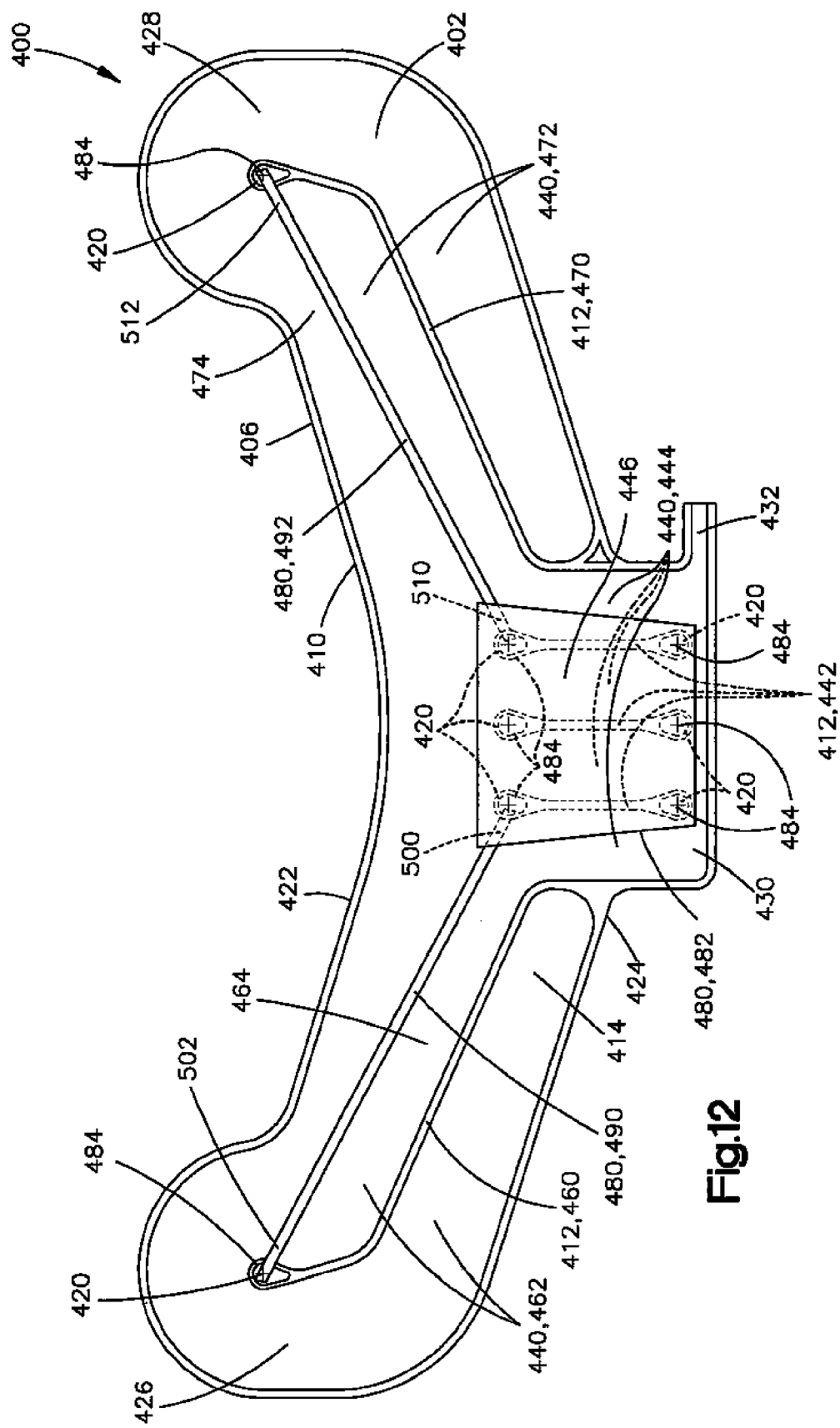

PEDESTRIAN AIR BAG

TECHNICAL FIELD

The present invention relates to an inflatable protection device for helping to protect a pedestrian from impacts with a vehicle.

BACKGROUND OF THE INVENTION

It is known to inflate an inflatable protection device to help protect a vehicle occupant upon the occurrence of an event for which occupant protection is desired, such as a vehicle collision or rollover. One particular type of inflatable protection device is an air bag. Occupant protecting air bags are inflatable in a passenger compartment of the vehicle between certain vehicle structures and one or more occupants of the vehicle. Another type of inflatable protection device is a pedestrian protecting air bag. Pedestrian protecting air bags are inflatable outside of the passenger compartment between certain external surfaces of the vehicle structure and pedestrians outside the vehicle.

SUMMARY OF THE INVENTION

The present invention relates to an apparatus for helping to protect a pedestrian from impacts with a vehicle that has a windshield and a hood covering an engine compartment. The apparatus includes an air bag that is inflatable away from the engine compartment through a space between the hood and the windshield from a stored condition to a deployed condition positioned adjacent the windshield. A housing stores the air bag in a deflated and stowed condition in the engine compartment. A deflector has a portion connected to the housing and a portion for being connected to the vehicle hood. The deflector is adapted to deflect the air bag during inflation and direct the air bag to clear the vehicle hood and to deploy through the space between the hood and the windshield.

The present invention also relates to an apparatus for helping to protect an occupant of a vehicle that has a windshield and a hood covering an engine compartment. The apparatus comprises an air bag that is inflatable away from the engine compartment through a space between the hood and the windshield from a stored condition to a deployed condition positioned adjacent the windshield. The air bag, when in the deployed condition, covers a driver side A-pillar, a passenger side A-pillar, and portions of the windshield extending between the A-pillars. The air bag comprises overlying panels and non-inflatable connections that interconnect the panels to define inflatable chambers of the air bag. The apparatus also includes at least one tether having opposite ends connected to the non-inflatable connections. The at least one tether restricts relative movement of the portions of the air bag to position the air bag against the windshield.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 12 is a rear plan view the a portion of the apparatus of FIG. 11.

DESCRIPTION OF EMBODIMENTS

Figure 1:
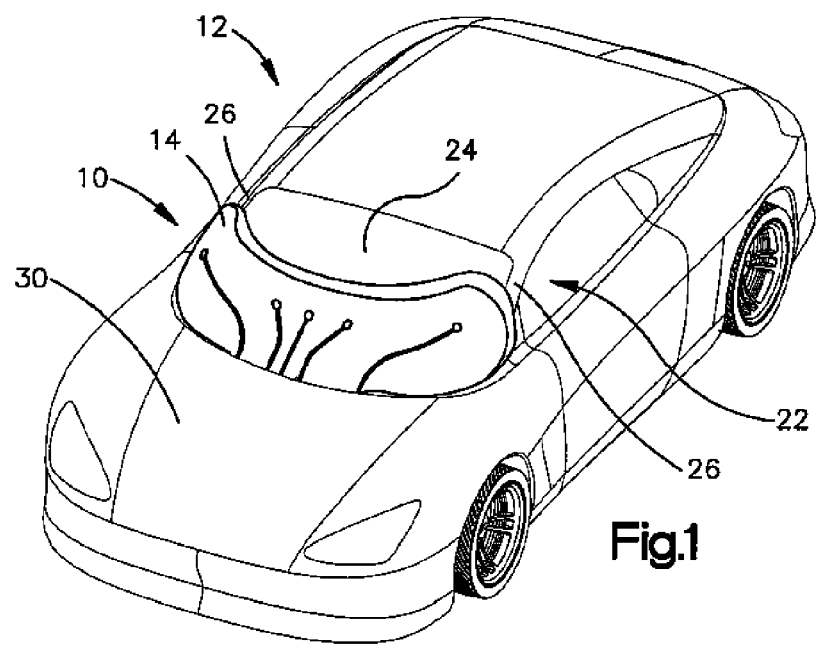
FIG. 1 is a perspective view illustrating a vehicle equipped with an apparatus for helping to protect a pedestrian from impacts with the vehicle, according to a first embodiment of the present invention.
Figure 2:
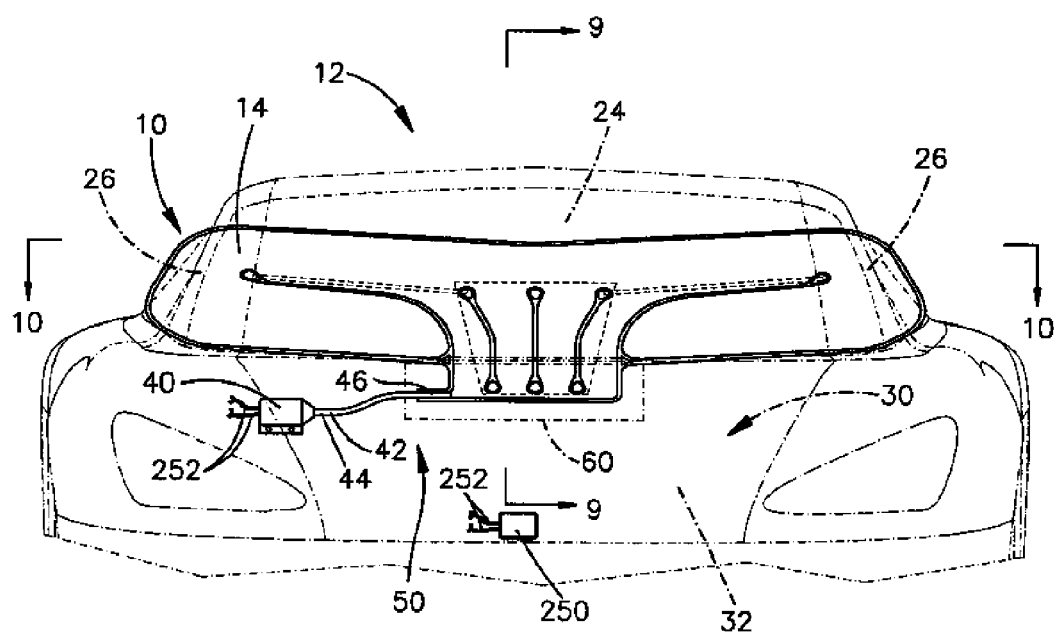
FIG. 2 is a front view of the apparatus of FIG. 1.

Representative of the present invention, FIGS. 1 and 2 illustrate an apparatus 10 for helping to protect pedestrians from impacts with a vehicle 12. The apparatus 10 includes an inflatable vehicle occupant protection device in the form of an air bag 14. The air bag 14 is an external air bag in that it is adapted for deployment outside the occupant compartment 22 of the vehicle 12. The air bag 14 has a deflated and stowed condition in or near an engine compartment 30 beneath the vehicle hood 32. The air bag 14 is inflatable from the deflated and stowed condition away from the engine compartment 30 and away from the vehicle hood 32 in a generally upward direction with respect to the vehicle to the deployed condition illustrated in FIGS. 1 and 2.

The air bag 14 can be formed from any suitable material. For example, the air bag 14 may be formed from a fabric woven with nylon yarns (e.g., nylon 6-6 yarns). Also, the air bag 14 may have any suitable construction. For example, the air bag 14 may have a one piece woven (OPW) construction in which the bag is woven as a single piece of material. As another example, the air bag 14 may be constructed by interconnecting fabric panels via suitable means, such as stitching, ultrasonic welding, heat bonding, or adhesives. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternative coatings, such as silicone, may also be used to construct the air bag 14.

Figure 3:
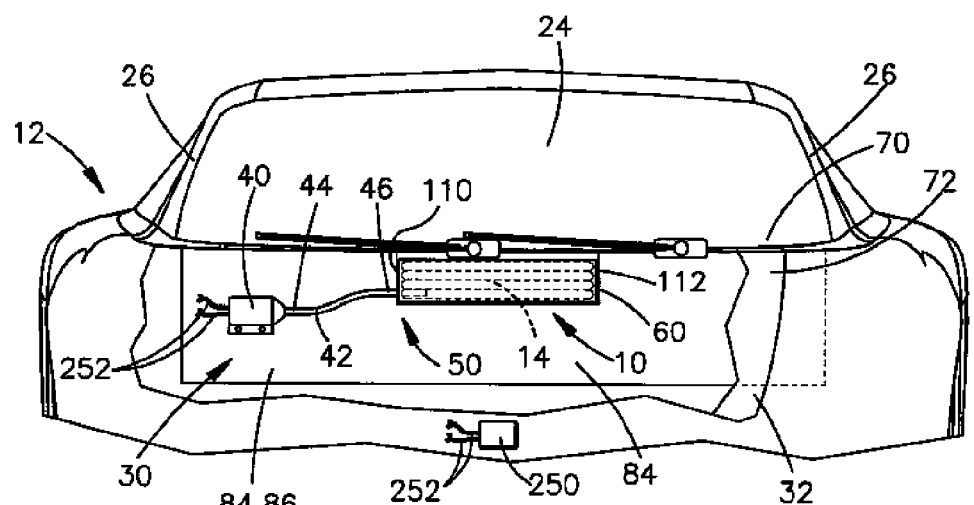
FIG. 3 is a front view of the vehicle of FIG. 1 illustrating the apparatus in a deflated and stored condition.
Figure 4:
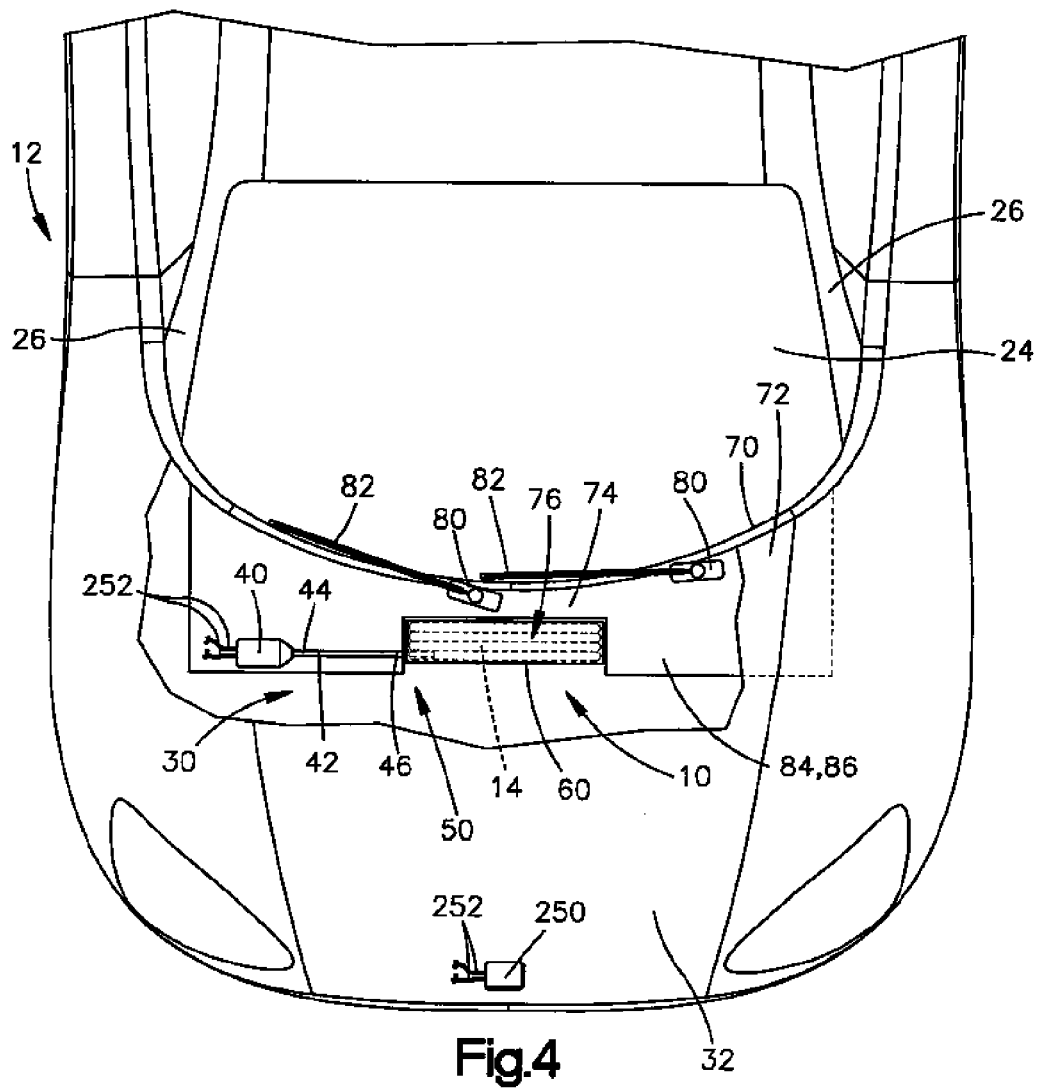
FIG. 4 is a top view of the vehicle of FIG. 1 illustrating the apparatus in a deflated and stored condition.

The apparatus 10 also includes an inflation fluid source in the form of an inflator 40 (see FIGS. 2-4). The inflator 40 is actuatable to provide inflation fluid for inflating the air bag 14. The inflator 40 may be of any suitable construction or configuration. For example, the inflator 40 may contain a stored quantity of pressurized inflation fluid (not shown) in the form of a gas for inflating the air bag 14. As another example, the inflator 40 could contain a combination of pressurized inflation fluid and ignitable material for heating the inflation fluid, or could be a pyrotechnic inflator that uses the combustion of gas-generating material to generate inflation fluid. As a further example, the inflator 40 could be of any suitable type or construction for supplying a medium for providing inflation fluid for inflating the air bag 14.

Referring to FIGS. 2-4, the inflator 40 is connected in fluid communication with the air bag 14 through a conduit or fill tube 42. The fill tube 42 may be constructed of any suitable material, such as metal, plastic, or fabric. Alternatively, the fill tube 42 may be omitted and inflation fluid could be discharged into the air bag 14 from the inflator 40 directly or through a manifold. The portion of the fill tube 22 positioned in the air bag 14 includes one or more of openings (not shown) through which inflation fluid is delivered to the air bag.

The air bag 14 forms part of an air bag module 50 that may be installed in the vehicle 12 as a unit. The air bag module 50 includes the air bag 14, inflator 40, fill tube 42, and a housing 60 for storing the air bag in the deflated and stored condition. In an assembled condition of the air bag module 50, the fill tube 42 has a first end portion 44 connected to the inflator 40 and an opposite second end portion 46 that extends into the housing 60 and into the air bag 14 through a mouth portion 48 of the air bag. In the assembled condition of the air bag module 50, the air bag 14 is folded, rolled, or otherwise placed in the deflated and stowed condition in the housing 60 (see FIGS. 3 and 4).

In the installed condition shown in FIGS. 3 and 4, the air bag module 50 is installed adjacent a lower edge 70 of the windshield 24 and a rear edge 72 of the vehicle hood 32. To make space for the air bag module 50 and to allow for deployment of the air bag 14 from beneath the vehicle hood 32, a portion of a trim piece 74 may be removed, leaving a space 76 for receiving the housing 60. The trim piece 74 is that typically used to block debris and channel water away from entering the engine compartment 30 through the gap between the hood 32 and the windshield 24. As shown in FIG. 4, the trim piece 74 may have portions 80 for receiving or accommodating vehicle windshield wipers 82.

In the installed condition, the air bag module 50 is secured to vehicle structure 84 such as a firewall 86 or a vehicle body/frame component 88, such as a cross beam. For example, in the illustrated embodiment, the housing 60 may be secured to a firewall 86 and the inflator 40 may be secured to a body/frame component 88. The fill tube 42 is secured to the inflator 40 and to the air bag 14 inside the housing 60. For additional support, the fill tube 42 could be secured to the housing 60 or to the vehicle structure 84, such as the firewall 86, the body/frame component 88, or to a combination of these structures.

Figure 5:
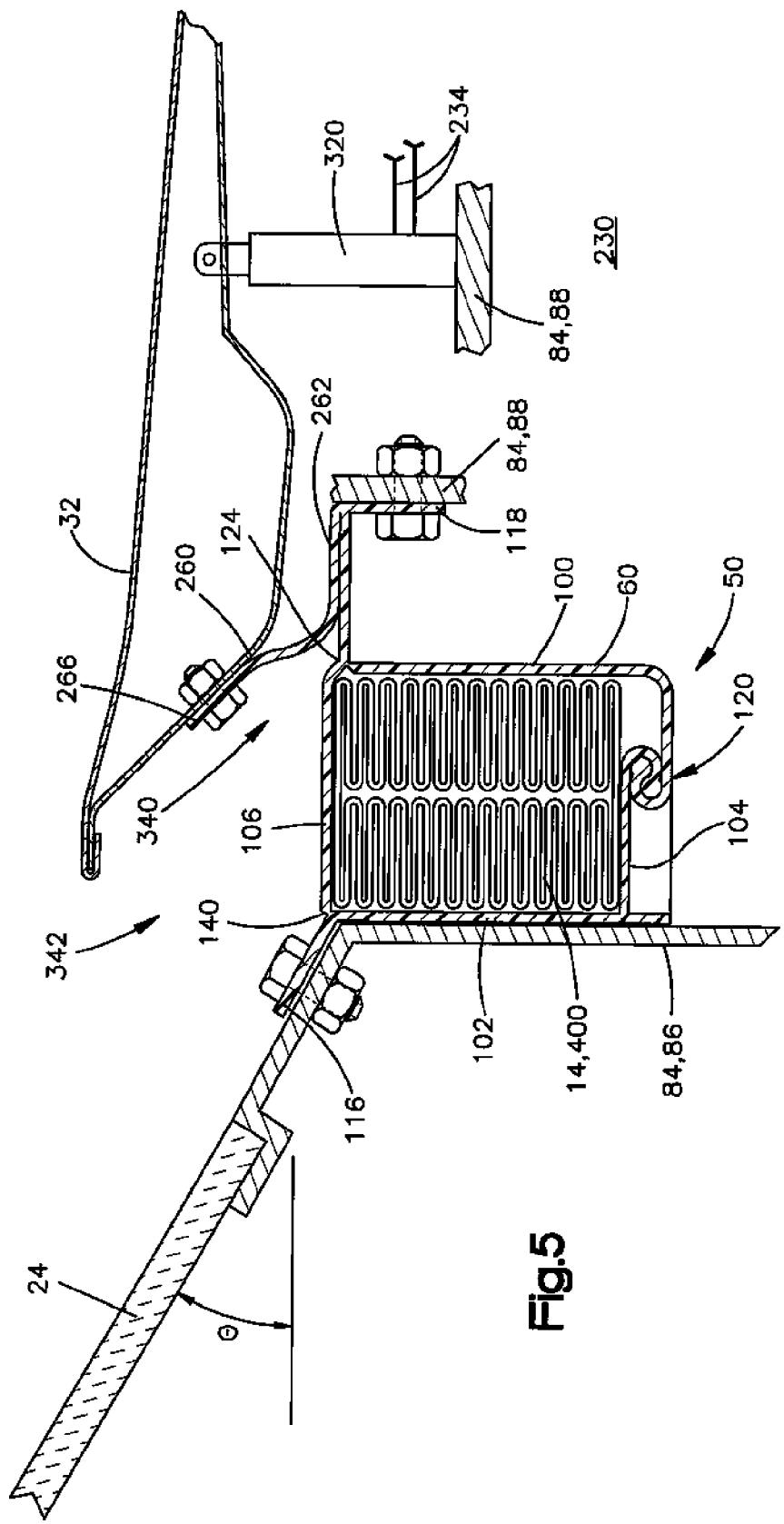
FIG. 5 is a sectional view illustrating the apparatus in a deflated and stored condition.
Figure 6:
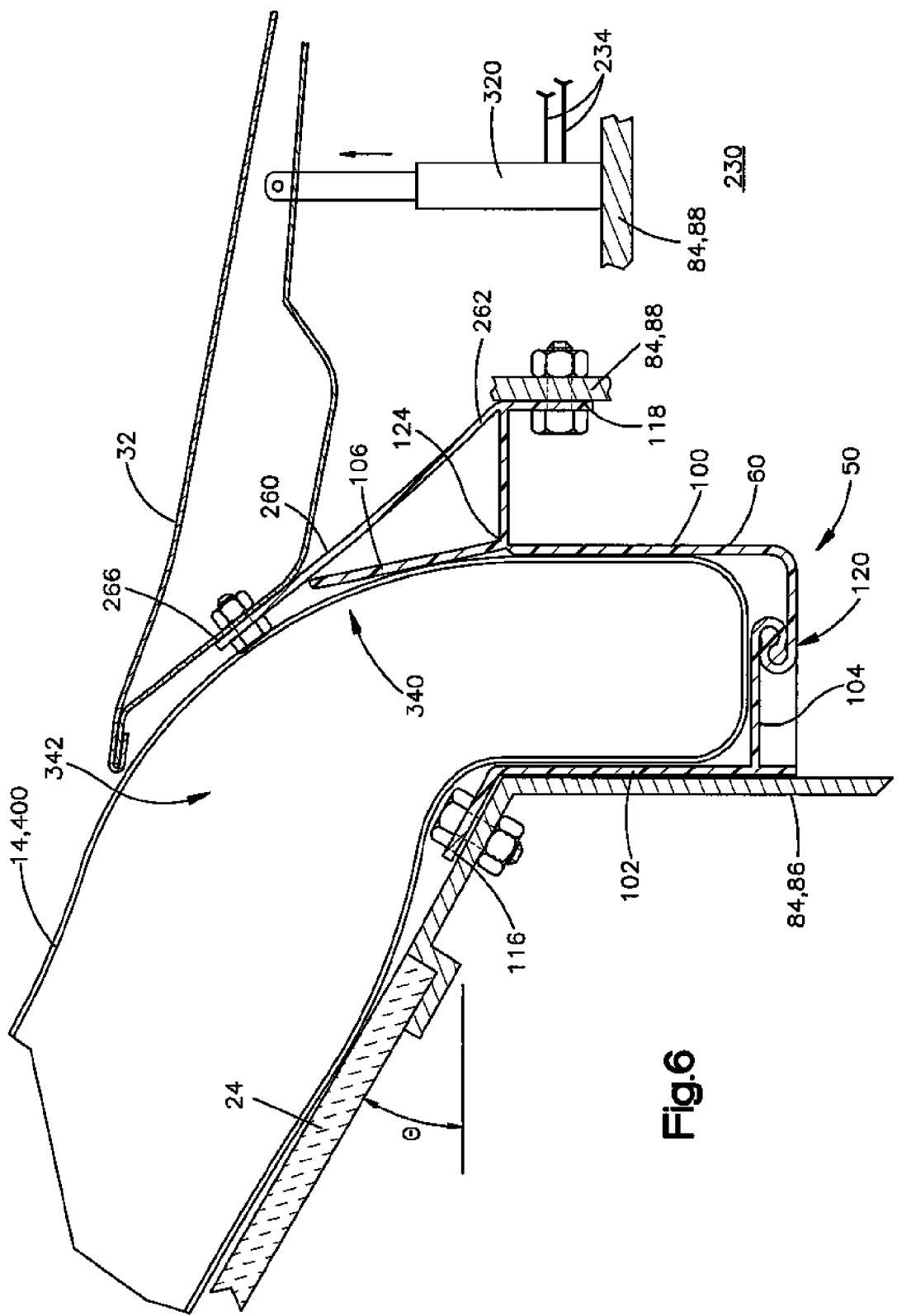
FIG. 6 is a sectional view illustrating the apparatus in an inflated and deployed condition.

Referring to FIGS. 5 and 6, the housing 60 includes a first or front side wall 100 and a second or rear side wall 102. The front and rear side walls 100 and 102 are spaced apart and extend generally parallel to each other. A base wall 104 and a top wall 106 extend between and interconnect the front and rear side walls 100 and 102. The housing 60 also includes opposite end walls 110 and 112 (see FIG. 3) that span the area defined by the front side wall 100, the rear side wall 102, the base wall 104, and the top wall 106 at opposite ends of the housing. As shown in FIGS. 5 and 6, the housing may also include tabs or brackets for helping to secure the housing and, thus, the air bag module 50 to the vehicle 12. For example, in the illustrated embodiment, a first tab or bracket 116 helps secure the housing 60 to the firewall 86 by known means, such as a threaded fastener. A second tab or bracket 118 helps secure the housing 60 to the body/frame component 88 by known means, such as a threaded fastener.

The housing 60 may have a one-piece construction in which the housing is manufactured (e.g., molded or extruded) as a single piece of material. As shown in FIGS. 5 and 6, the base 104 wall includes a locking element 120, such as an arrangement of interlocking U-shaped beads or channels 122, that helps facilitate the one-piece construction. To further facilitate the one-piece construction, the housing 60 is manufactured with joints 124 that allow portions of the housing to pivot or bend relative to each other. For example, a joint 124 located at the intersection of the front side wall 100 and the top wall 106 may facilitate opening the housing 60 to release the inflating air bag 14. As another example, a joint 124 located at the intersection of the front side wall 100 and the base wall 104, the rear side wall 102 and the top wall 106, and the rear side wall 102 and the base wall 104 may allow for bending or pivoting of the walls to manipulate the housing 60 during assembly with the module 50. The joints 124 connect the adjacent housing walls and may comprise thinned portions of the housing wall that facilitate the relative pivoting or bending movement between the walls.

In the assembled condition, the housing 60 is manipulated to place the walls in the relative positions illustrated in FIG. 5, and the locking element 120 is locked by engaging the U-shaped channels 122 to maintain the housing in the assembled condition. As a result, the locking elements 120 maintain the relative positions of the housing walls as shown in FIG. 5.

The housing 60 includes a tear seam 140 that is rupturable to allow the housing to transition from the stored condition of FIG. 5 to the deployed condition of FIG. 6. As shown in FIGS. 5 and 6, the tear seam 140 may comprise one of the joints 124, particularly the joint that joins the rear side wall 102 and the top wall 106. The tear seam 140 may comprise a portion of the housing having a thickness that is reduced over that of the other joints 124 and, thus, is adapted to rupture reliably in response to deployment of the air bag 14.

Figure 7:
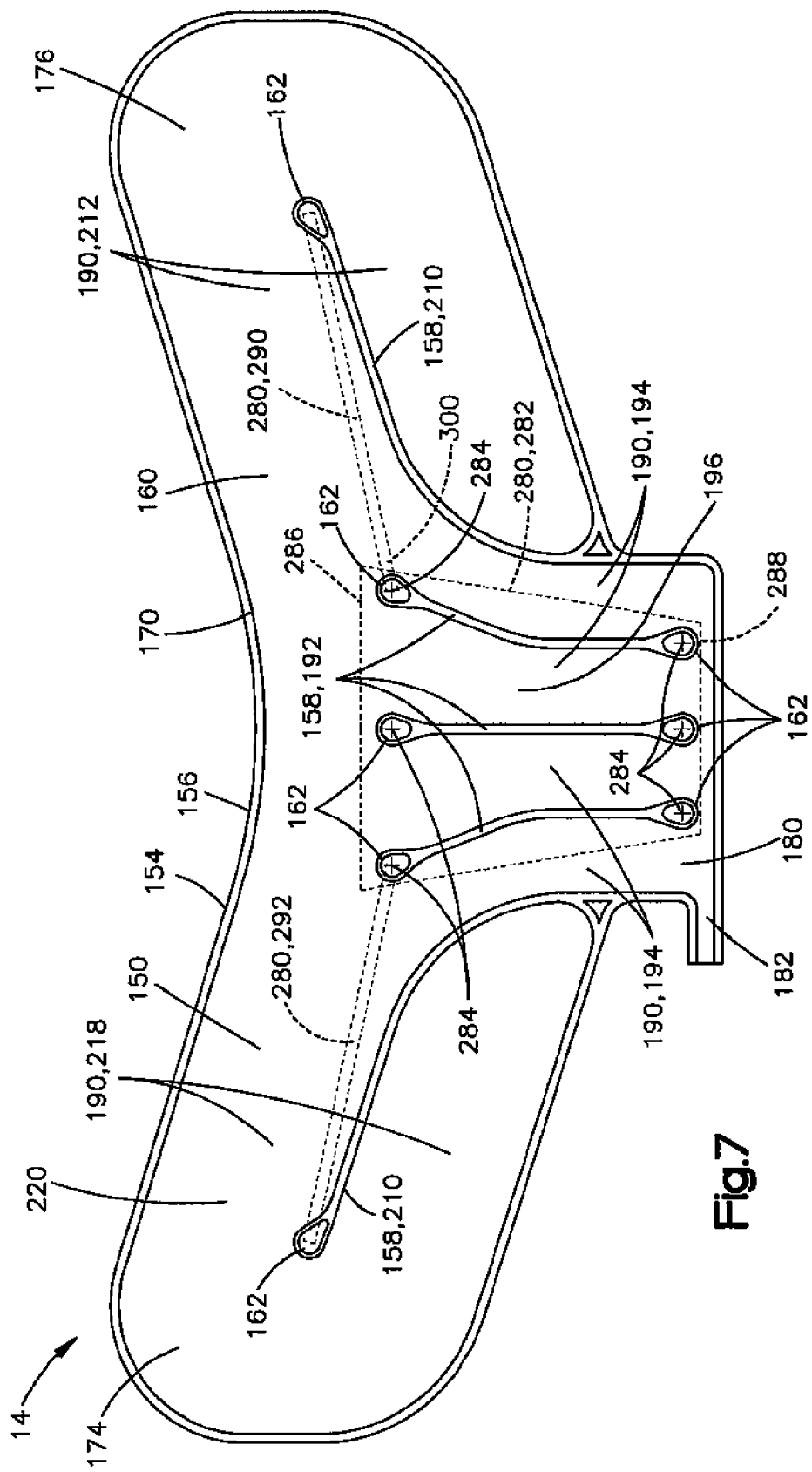
FIG. 7 is a front plan view of a portion of the apparatus.
Figure 8:
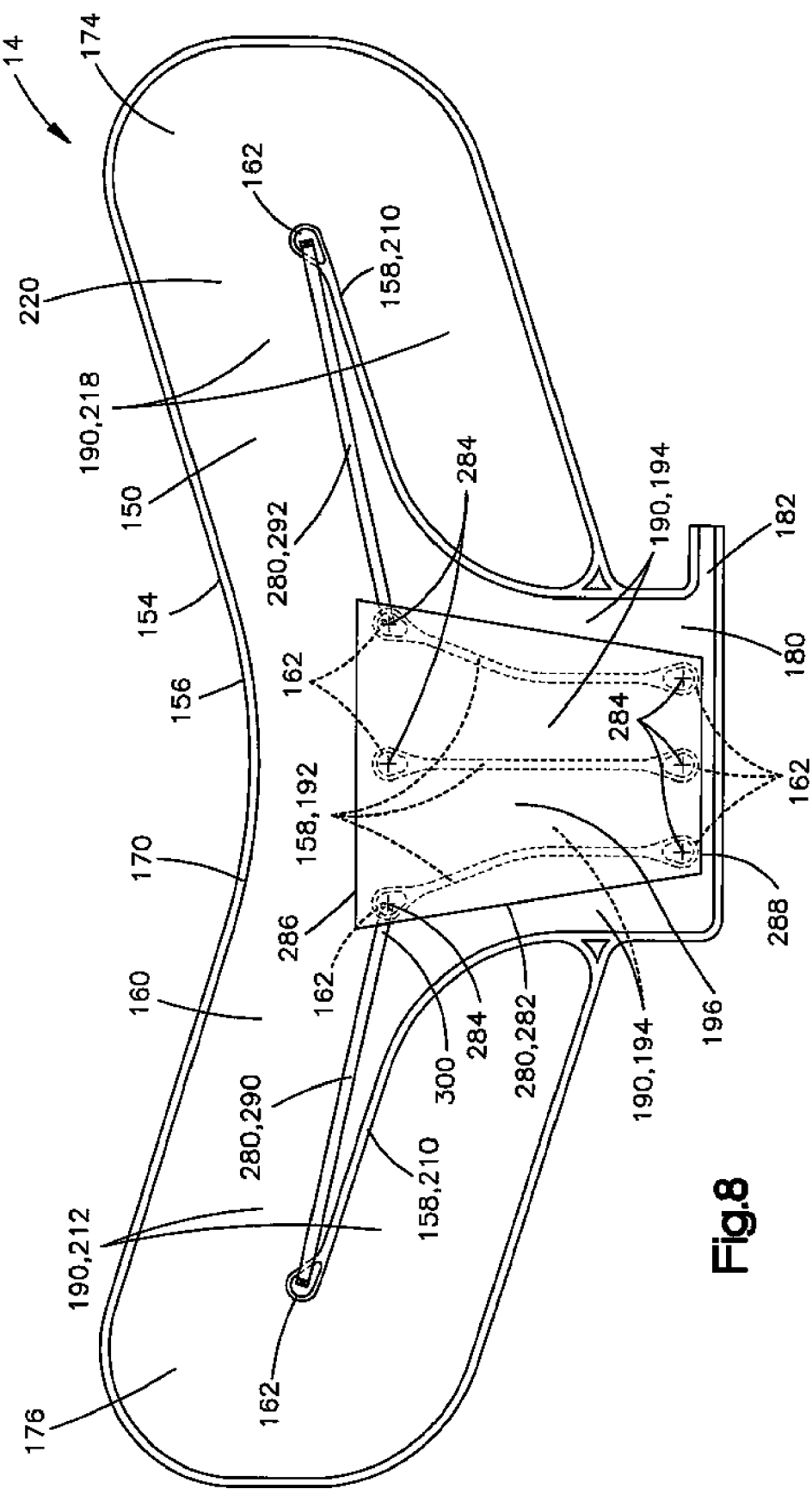
FIG. 8 is a rear plan view of the portion of the apparatus of FIG. 7.

Referring to FIGS. 7 and 8, the air bag 14 comprises a front panel 150 (FIG. 7) and a rear panel 152 (FIG. 8) that are arranged in an overlying manner. A peripheral connection 154 interconnects the overlying panels 150 and 152 about a periphery 156 of the air bag 14. The air bag 14 may also include interior connections 158 that interconnect the panels at certain locations within the periphery of the air bag. The overlying panels 150 and 152 along with the connections 154 and 158 define an inflatable volume 160 of the air bag 14.

The panels 150 and 152 may comprise two or more separate panels that are interconnected by known means, such as stitching, ultrasonic welding, heat bonding, or adhesives to form the peripheral connection 154 and interior connections 158 of the air bag 14. Alternatively, in the a one-piece woven construction, the panels 150 and 152 may be woven simultaneously and have portions woven together to form the connections 154 and 158. As shown in FIGS. 7 and 8, the connections 154 and 158 may have end portions 162 that are rounded so as to avoid the formation of stress risers that may result in leakage or rupture when the air bag 14 is inflated. The air bag 14 includes an upper edge 170 and an opposite lower edge 172 that extend between first and second end portions 174 and 176. A centrally located mouth portion 180 extends downward from the lower edge 172 and includes a neck portion 182 for receiving the fill tube 42.

The interior connections 158 limit the inflated thickness of the air bag 14 and help define inflatable chambers 190 of the air bag. The chambers 190 also help dictate the direction and path along which inflation fluid enters the inflatable volume 160 of the air bag 14. Central connections 192 define central chambers 194 that help define the shape of a central portion 196 of the air bag 14 and direct inflation fluid into the inflatable volume 160 from the mouth portion 180. Lateral connections help define lateral chambers that help define the shape of lateral portions of the air bag 14 and the path along which inflation fluid is directed into the lateral portions. More specifically, a first or driver side lateral connection 210 helps define the shape of driver side chambers 212 of a driver side lateral portion 214 of the air bag 14 and thus help define the path along which inflation fluid is directed into the driver side lateral portion. A second or passenger side lateral connection 216 helps define the shape of passenger side chambers 218 of a passenger side lateral portion 220 of the air bag 14 and thus help define the path along which inflation fluid is directed into the passenger side lateral portion.

Upon sensing the occurrence of an event for which inflation of the air bag 14 is desired, a sensor 250 (see FIGS. 2-4) provides an actuation signal to the inflator 40 via lead wires 252. Upon actuation of the inflator 40, inflation fluid is directed through the fill tube 42 into the air bag 14. The inflating air bag 14 ruptures the housing 60 along the tear seam 140 and the top wall 106 moves to the open condition (see FIG. 6). The air bag 14 inflates and deploys under the pressure of inflation fluid provided by the inflator 42 from the stored position to the deployed position.

When the inflator 40 is actuated, inflation fluid is directed first through the mouth portion 180 and into the central chambers 194 of the air bag 14. Inflation fluid then enters the driver side chambers 212 and passenger side chambers 218. As shown in FIGS. 7 and 8, the configuration of the driver side lateral connection 210 is such that the inflation fluid enters first into an upper one of the driver side chambers 212. The inflation fluid must pass through the upper one of the driver side chambers 212 before entering the lower one of the driver side chambers 212. Similarly, the configuration of the passenger side lateral connection 216 is such that the inflation fluid enters first into an upper one of the passenger side chambers 218. The inflation fluid must pass through the upper one of the passenger side chambers 218 before entering the lower one of the passenger side chambers 218. This configuration may be advantageous because it provides for a rapid deployment of the central chambers 194 and the upper ones of the driver and passenger side lateral chambers 212 and 218. The air bag 14 thus may be positioned quickly in response to the sensed event.

In the deployed position (see FIGS. 1, 2, and 6), the air bag 14 is positioned adjacent the windshield 24 and extends across the width of the windshield. The air bag 14 also covers at least a portion of the A-pillars 26. The air bag 14 when in the inflated and deployed condition may be positioned between pedestrians outside the vehicle 12 and the windshield 24 and A-pillars 26. The air bag 14 thus can help absorb impacts with the air bag and helps distribute the energy of impacts throughout a large area of the air bag.

As shown in FIGS. 5 and 6, the vehicle 12 may include one or more hood lifters 320 connected to the hood 32 and to a vehicle body/frame component 84 of the vehicle. The hood lifters 320 may, for example, comprise pyrotechnic actuators. Upon sensing the occurrence of an event, such as a vehicle impact, the hood lifters 320 lift the hood 32 from the position illustrated in FIG. 5 to the position illustrated in FIG. 6. The hood lifters 320 may, for example, lift the hood 32 in response to the signal provided by the sensor 250 indicative of sensing the occurrence of an event for which inflation of the air bag 14 is desired. In this instance, the sensor 250 may provide an actuation signal to the hood lifters 232 via lead wires 234. Alternatively, the hood lifters 232 may be associated with a sensor (not shown) that is separate from the sensor 250 and that actuates the hood lifters independently of the sensor and air bag 14.

According to the present invention, the apparatus 10 includes means for helping to control deployment of the air bag 14 and for helping to control deployment and/or maintain the inflated position of the air bag after deployment. The air bag housing 60 includes a deflector 260 for helping control deployment of the air bag 14 by directing the air bag to deploy from the engine compartment 30 without being impeded by the vehicle hood 32. Referring to FIGS. 5 and 6, the deflector 260 is formed as an integral portion of the air bag housing 60. Those skilled in the art, however, will appreciate that the deflector 260 could be an individual, separately mounted component of the apparatus 10. In the illustrated embodiment, the deflector 260 has a first end portion 262 that merges with and extends from the second bracket 118 of the housing 60. The first end portion 262 of the deflector 260 is thus secured to the body/frame component 84, for example, a cross beam in the engine compartment 30, which provides a strong, rigid point of connection for the deflector 260. The deflector 260 has a second end portion 266, opposite the first end portion 262, secured to the vehicle hood 32 by known means, such as a threaded fastener. The deflector 260 is made of a flexible and resilient material, such as a plastic material, that allows for maintaining the connection between the hood 32 and the deflector even in the event of hood displacement via actuation of the hood lifters 320. Additionally, this flexible and resilient construction allows the deflector 260 to withstand repeated manipulation and flexure due to opening and closing of the vehicle hood 32.

Additionally, according to the present invention, the air bag 14 includes flexible elongated members 280, such as tethers, sheets of material, or a combination of these members, that help to control the position and shape of the inflated air bag. Referring to FIG. 8, the flexible elongated members 280 comprise a central tether 282 and lateral tethers 290 and 292 that are connected to the air bag 14 on the rear, i.e., rear panel 152 of the air bag. The central tether 282 covers and interconnects parts of the central portion 196 of the air bag 14. The lateral tethers 290 and 292 interconnect the lateral portions 204 of the air bag 14 to the central portion 196 of the air bag.

The central tether 282 comprises a flexible sheet of material, such as a woven nylon material that is similar or identical to the material used to form the air bag 14. The central tether 282 has a generally trapezoidal shape and is connected to the air bag 14 by known means, such as stitching or ultrasonic welding, at connection points 284. For example, the connection points 284 connecting the central tether 282 to the air bag 14 may comprise stitching located at the rounded portions 162 of the central connections 192. This may be advantageous because the rounded portions 162 comprise non-inflatable portions of the air bag 14, so the stitching 284 will not compromise the permeability of the air bag. In the illustrated embodiment, the central tether 282 is connected to the air bag 14 at three locations along a first edge 286 and at three locations along a second edge 288 of the central tether. According to the present invention, the length of the central tether 282 measured between corresponding connection points 284 along the first and second edges 286 and 288 is shorter than the distance between the rounded portions 162 on the air bag 14 where the connection points are located.

The first or driver side tether 290 interconnects the driver side lateral portion 214 of the air bag 14 to the central portion 196 of the air bag. In the illustrated embodiment, the driver side tether 290 has a first end portion 300 connected to the central portion 196 at a location on one of the rounded portions 162 of the central connection 192 closest to or adjacent the driver side lateral portion 214. The driver side tether 290 has a second end portion 302, opposite the first end portion 300, connected to the driver side lateral portion 214 at a connection 304 located on the rounded portion 162 of the driver side lateral connection 210. According to the present invention, the length of the driver side tether 290 measured between the connection points 284 is shorter than the distance between the rounded portions 162 on the air bag 14 where the connection points are located.

The second or passenger side tether 292 interconnects the passenger side lateral portion 220 of the air bag 14 to the central portion 196 of the air bag. The passenger side tether 292 has a first end portion 310 connected to the central portion 196 at a location on one of the rounded portions 162 of the central connection 192 closest to or adjacent the passenger side lateral portion 220. The passenger side tether 292 has a second end portion 312, opposite the first end portion 310, connected to the passenger side lateral portion 220 at a connection 314 located on the rounded portion 162 of the passenger side lateral connection 216. According to the present invention, the length of the passenger side tether 292 measured between the connection points 284 is shorter than the distance between the rounded portions 162 on the air bag 14 where the connection points are located.

Referring to FIGS. 5 and 6, during inflation and deployment, the deflector 260 spans the space 340 between the hood 32 and the air bag housing 60. The deflector 260 helps to direct or control the deployment trajectory of the air bag 14. When the air bag 14 is deployed, it engages the deflector 260, which deflects the air bag so that it clears the vehicle hood 32 and deploys through the opening 342 between the hood and the windshield 24. If the vehicle 12 is equipped with hood lifters 320, the space 340 may be enlarged due to their actuation in response to sensing the occurrence of the event for which inflation of the air bag 14 is desired. The deflector 260, being connected to the hood 32 and being flexible in construction, moves with the hood when moved by the lifters 320 and thus maintains its position spanning the space 340 between the hood and the housing 60. The deflector 260 can thus direct the air bag 14 to deploy through the opening 342 regardless of whether the vehicle 12 includes hood lifters 320 and regardless of whether the hood lifters raise the hood 32.

When the air bag 14 is in the inflated and deployed condition, the central tether 282 becomes tensioned and restricts relative movement of the rounded portions 162 on the rear panel 152. The central tether 282 thus restricts movement and deployment of the central portion 196 of the air bag 14. As a result, the central tether 282 can help control the deployment trajectory and also the inflated and deployed position of the air bag 14. This is shown in FIGS. 9 and 10.

Figure 9:
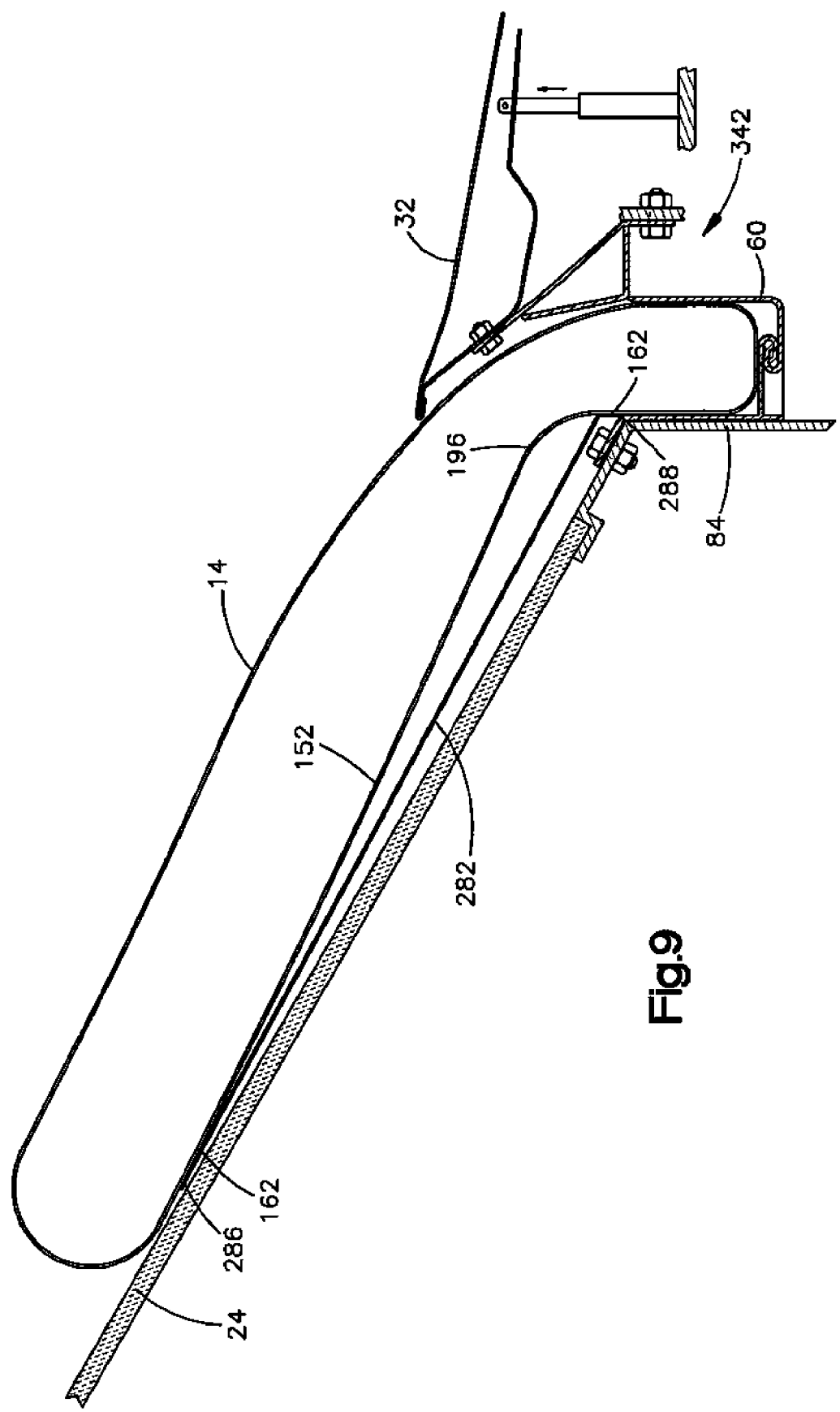
FIG. 9 is a sectional view taken generally along line 9-9 in FIG. 2.
Figure 10:
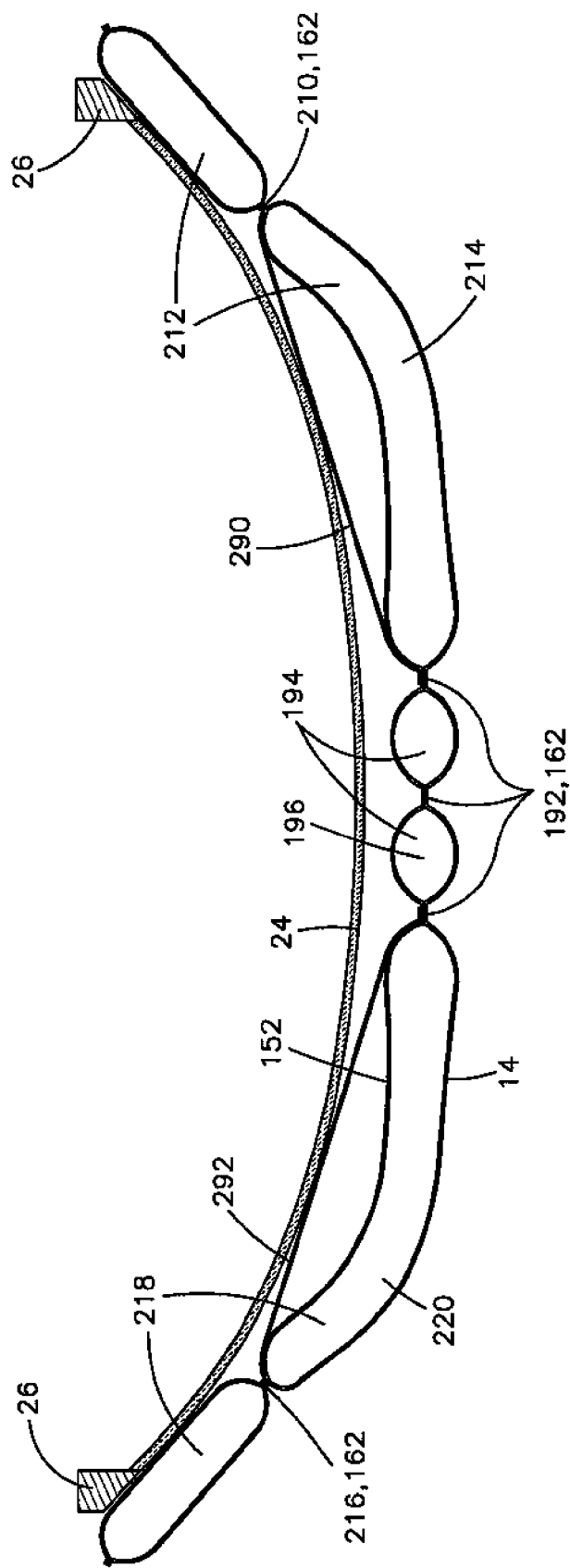
FIG. 10 is a sectional view taken generally along line 10-10 in FIG. 2.

Referring to FIGS. 9 and 10, during deployment, the central tether 282 restricts movement away from the housing 60 of the portion of the air bag 14 connected along the first edge 286 of the central panel. As a result, the central tether 282 helps control the deployment trajectory of the air bag 14 so that it clears the vehicle hood 32 and deploys through the space 342 between the hood and the windshield 24. Once deployed, the central tether 282 also helps maintain the air bag 14 positioned adjacent or against the windshield 24. As best shown in FIG. 9, in response to inflation and deployment of the air bag 14, the central tether 282 exerts a force on the rear panel 152 that pulls the rear panel toward the windshield 24. The rear panel 152 being pulled against the windshield 24 moves the air bag 14 against the windshield and maintains this air bag position while the bag is inflated. The air bag 14 thus extends along or follows the angle of inclination, indicated generally at 9, of the windshield 24.

Additionally, when the air bag 14 is in the inflated and deployed condition, the driver side tether 290 and passenger side tether 292 become tensioned and restricts relative movement of the rounded portions 162 to which they are connected. The driver side tether 290 and passenger side tether 292 thus restrict relative movement and deployment of corresponding portions of the rear panel 152 of the air bag 14. As a result, the driver side tether 290 can help control the deployment trajectory and also the inflated and deployed position of the driver side lateral portion 214 of the air bag 14. Additionally, the passenger side tether 292 can help control the deployment trajectory and also the inflated and deployed position of the passenger side lateral portion 220 of the air bag 14. This is shown in FIGS. 9 and 10. Referring to FIGS. 9 and 10, during deployment, the driver side tether 290 restricts movement of the driver side lateral portion 214 away from the central portion 196 of the air bag 14. The passenger side tether 292 restricts movement of the passenger side lateral portion 220 away from the central portion 196 of the air bag 14. As best shown in FIG. 10, in response to inflation and deployment of the air bag 14, the driver side tether 290 exerts a force that pulls the driver side lateral portion 214 of the air bag 14 against the windshield 24 and maintains the driver side lateral portion positioned against the windshield while the air bag is inflated. Also, in response to inflation and deployment of the air bag 14, the passenger side tether 292 exerts a force that pulls the passenger side lateral portion 220 of the air bag 14 against the windshield 24 and maintains the passenger side lateral portion positioned against the windshield while the air bag is inflated.

From the above, those skilled in the art will appreciate that the driver side tether 290 helps maintain the driver side lateral portion 214 positioned adjacent or against the windshield 24, and the passenger side tether 292 helps maintain the passenger side lateral portion 220 positioned adjacent or against the windshield. The tethers 290 and 292 thus help the air bag 14 to conform to the lateral shape or contour of the vehicle 12, particularly the windshield 24. This allows the air bag 14 to be positioned against the windshield 24 and A-pillars 26 of the vehicle 12, which helps ensure that the air bag maintains the desired position relative to the vehicle and provides the desired degree of windshield and A-pillar coverage.

Those skilled in the art will recognize that the configuration of the vehicle structure, and thus the spatial and interconnecting relationships between the vehicle structure (e.g., the windshield 24, A-pillars 26, and hood 32, and the components of the air bag module 50), may vary depending upon the particular design of the vehicle 12. Therefore, it will be appreciated that the vehicle structure illustrated in the Figures and the spatial and interconnecting relationships between the vehicle structure and the air bag module 50 are for illustrative purposes and may vary without departing from the spirit of the present invention.

Figure 11:
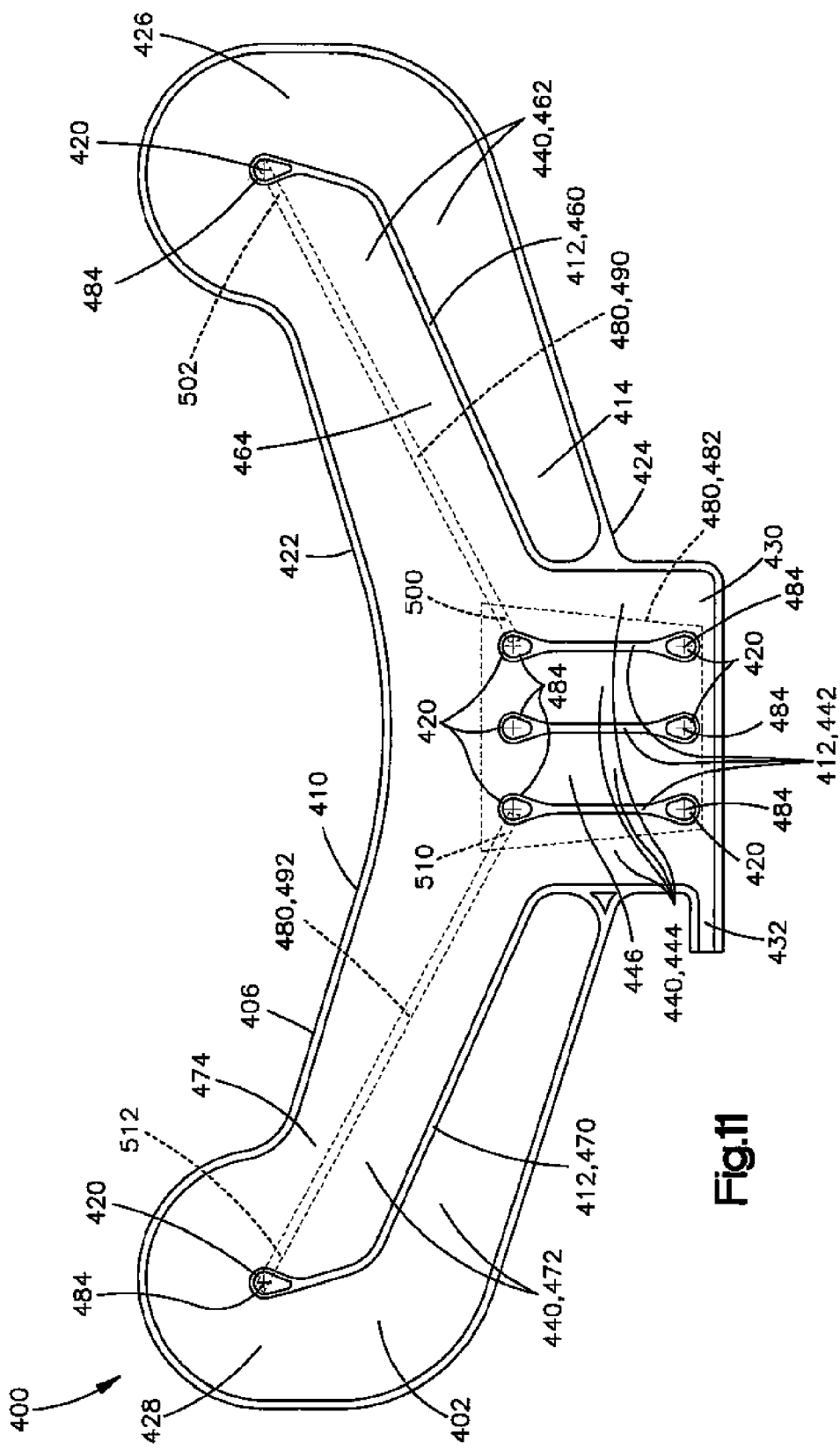
FIG. 11 is a front plan view of a portion of an apparatus for helping to protect a pedestrian from impacts with the vehicle, according to a second embodiment of the present invention.

For example, according to a second embodiment of the present invention, the air bag may have a configuration that is different that the configuration of the air bag illustrated in FIGS. 1-10. Referring to FIGS. 11 and 12, an air bag 400 comprises a front panel 402 (FIG. 11) and a rear panel 404 (FIG. 12) that are arranged in an overlying manner. A peripheral connection 406 interconnects the overlying panels 402 and 404 about a periphery 410 of the air bag 400. The air bag 400 may also include interior connections 412 that interconnect the panels at certain locations within the periphery 410 of the air bag. The overlying panels 402 and 404 along with the connections 406 and 412 define an inflatable volume 414 of the air bag 400.

The panels 402 and 404 may comprise two or more separate panels that are interconnected by known means, such as stitching, ultrasonic welding, heat bonding, or adhesives to form the peripheral connection 406 and interior connections 412 of the air bag 400. Alternatively, in the aforementioned one piece woven construction, the panels 402 and 404 may be woven simultaneously and have portions woven together to form the connections 406 and 412. As shown in FIGS. 11 and 12, the connections 406 and 412 may have end portions 420 that are rounded so as to avoid the formation of stress risers that may result in leakage or rupture when the air bag 400 is inflated. The air bag 400 includes an upper edge 422 and an opposite lower edge 424 that extend between first and second end portions 426 and 428. A centrally located mouth portion 430 extends downward from the lower edge 424 and includes a neck portion 432 for receiving the fill tube (not shown).

The interior connections 412 limit the inflated thickness of the air bag 400 and help define inflatable chambers 440 of the air bag. The chambers 440 also help dictate the direction and path along which inflation fluid enters the inflatable volume 414 of the air bag 400. Central connections 442 define central chambers 444 that help define the shape of a central portion 446 of the air bag 400 and direct inflation fluid into the inflatable volume 414 from the mouth portion 430. Lateral connections help define lateral chambers that help define the shape of lateral portions of the air bag 400 and the path along which inflation fluid is directed into the lateral portions. More specifically, a first or driver side lateral connection 460 helps define the shape of driver side chambers 462 of a driver side lateral portion 464 of the air bag 400 and thus help define the path along which inflation fluid is directed into the driver side lateral portion. A second or passenger side lateral connection 470 helps define the shape of passenger side chambers 472 of a passenger side lateral portion 474 of the air bag 400 and thus help define the path along which inflation fluid is directed into the passenger side lateral portion.

As shown in FIGS. 11 and 12, the air bag 400 of the second embodiment differs in configuration from the air bag of the embodiments of FIGS. 1-10. The central portion 446, the driver side lateral portion 464, and the passenger side lateral portion 474 have a height measured between the upper and lower edges 402 and 404 of the air bag 400 that is shorter than the height of the air bag 14 of FIGS. 1-10. The driver side end portion 426 and passenger side end portion 428, however, curve upward from the lateral portions 464 and 474, respectively, and extend vertically above the upper edge 402 of the air bag 400. The driver side end portion 426 and passenger side end portion 428 thus may cover an extended portion of the driver side and passenger side A-pillars 26, respectively.

Additionally, according to the second embodiment of the present invention, the air bag 400 includes flexible elongated members 480, such as tethers, sheets of material, or a combination of these members, that help to control the position and shape of the inflated air bag. Referring to FIG. 12, the flexible elongated members 480 comprise a central tether 482 and lateral tethers 490 and 492 that are connected to the air bag 440 on the rear, i.e., rear panel 404 of the air bag. The central tether 482 covers and interconnects parts of the central portion 446 of the air bag 400. The lateral tethers 490 and 492 interconnect the lateral portions 464 and 474 of the air bag 400 to the central portion 446 of the air bag.

The central tether 482 comprises a flexible sheet of material, such as a woven nylon material that is similar or identical to the material used to form the air bag 400. The central tether 482 has a generally trapezoidal shape and is connected to the air bag 400 by known means, such as stitching or ultrasonic welding, at connection points 484. For example, the connection points 484 connecting the central tether 482 to the air bag 400 may comprise stitching located at the rounded portions 420 of the central connections 442. This may be advantageous because the rounded portions 420 comprise non-inflatable portions of the air bag 400, so the connection points 484 (stitching, for example) will not compromise the permeability of the air bag. In the illustrated embodiment, the central tether 482 is connected to the air bag 400 at three locations along a first edge 486 and at three locations along a second edge 488 of the central tether. According to the present invention, the length of the central tether 482 measured between corresponding connection points 484 along the first and second edges 486 and 488 is shorter than the distance between the rounded portions 420 on the air bag 400 where the connection points are located.

The first or driver side tether 490 interconnects the driver side lateral portion 428 of the air bag 400 to the central portion 446 of the air bag. In the illustrated embodiment, the driver side tether 490 has a first end portion 500 connected to the central portion 446 at a location on one of the rounded portions 420 of the central connection 442 closest to or adjacent the driver side lateral portion 428. The driver side tether 490 has a second end portion 502, opposite the first end portion 500, connected to the driver side lateral portion 464 at a location on the rounded portion 420 of the driver side lateral connection 460. According to the present invention, the length of the driver side tether 490 measured between the connection points 484 is shorter than the distance between the rounded portions 420 on the air bag 400 where the connection points are located.

The second or passenger side tether 492 interconnects the passenger side lateral portion 474 of the air bag 400 to the central portion 446 of the air bag. The passenger side tether 492 has a first end portion 510 connected to the central portion 446 at a location on one of the rounded portions 420 of the central connection 442 closest to or adjacent the passenger side lateral portion 474. The passenger side tether 492 has a second end portion 512, opposite the first end portion 510, connected to the passenger side lateral portion 474 at a location on the rounded portion 442 of the passenger side lateral connection 470. According to the present invention, the length of the passenger side tether 492 measured between the connection points 484 is shorter than the distance between the rounded portions 442 on the air bag 400 where the connection points are located.

The air bag 400 is packaged in a module that is similar or identical to the module illustrated in FIGS. 5 and 6 and therefore is described in this and the following paragraphs in reference to FIGS. 5 and 6. Referring to FIGS. 5 and 6, during inflation and deployment, the deflector 260 spans the space 340 between the hood 32 and the air bag housing 60. The deflector 260 helps to direct or control the deployment trajectory of the air bag 400. When the air bag 400 is deployed, it engages the deflector 260, which deflects the air bag so that it clears the vehicle hood 32 and deploys through the opening 342 between the hood and the windshield 24. If the vehicle 12 is equipped with hood lifters 320, the space 340 may be enlarged due to their actuation in response to sensing the occurrence of the event for which inflation of the air bag 400 is desired. The deflector 260, being connected to the hood 32, moves with the hood when move by the lifters 320 and thus maintains its position spanning the space 340 between the hood and the housing 60. The deflector 260 can thus direct the air bag 400 to deploy through the opening 342 regardless of whether the vehicle 12 includes hood lifters 320 and regardless of whether the hood lifters raise the hood 32.

When the air bag 400 is in the inflated and deployed condition, the central tether 482 becomes tensioned and restricts relative movement of the rounded portions 442 on the rear panel 404. The central tether 482 thus restricts relative movement and deployment of the central portion 446 of the air bag. As a result, the central tether 482 can help control the deployment trajectory and also the inflated and deployed position of the air bag 400. This is shown in FIGS. 13 and 14.

Referring to FIGS. 13 and 14, during deployment, the central tether 482 restricts movement away from the housing 60 of the portion of the air bag 400 connected along the first edge 486 of the central tether 482. As a result, the central tether 482 helps control the deployment trajectory of the air bag 400 so that it clears the vehicle hood 32 and deploys through the space between the hood and the windshield 24. Once deployed, the central tether 482 also helps maintain the air bag 400 positioned adjacent or against the windshield 24. As best shown in FIG. 13, in response to inflation and deployment of the air bag 400, the central tether 482 exerts a force on the rear panel 404 that pulls the rear panel toward the windshield 24. The rear panel 404 being pulled against the windshield 24 moves the air bag 400 against the windshield and maintains this air bag position while the bag is inflated.

Additionally, when the air bag 400 is in the inflated and deployed condition, the driver side tether 490 and passenger side tether 492 become tensioned and restricts relative movement of the rounded portions 420 to which they are connected. The driver side tether 490 and passenger side tether 492 thus restrict relative movement and deployment of corresponding portions of the rear panel 404 of the air bag 400. As a result, the driver side tether 490 can help control the deployment trajectory and also the inflated and deployed position of the driver side lateral portion 464 of the air bag 400. Additionally, the passenger side tether 492 can help control the deployment trajectory and also the inflated and deployed position of the passenger side lateral portion 474 of the air bag 400. This is shown in FIGS. 13 and 14.

Referring to FIGS. 13 and 14, during deployment, the driver side tether 490 restricts movement of the driver side lateral portion 464 away from the central portion 446 of the air bag 400. The passenger side tether 492 restricts movement of the passenger side lateral portion 474 away from the central portion 446 of the air bag 400. As best shown in FIG. 13, in response to inflation and deployment of the air bag 400, the driver side tether 490 exerts a force that pulls the driver side lateral portion 464 of the air bag 400 against the windshield 24 and maintains the driver side lateral portion positioned against the windshield while the air bag is inflated. In doing so, the driver side tether 490 also pulls the driver side end portion 426 against the driver side A-pillar 26. Also, in response to inflation and deployment of the air bag 400, the passenger side tether 492 exerts a force that pulls the passenger side lateral portion 474 of the air bag 400 against the windshield 24 and maintains the passenger side lateral portion positioned against the windshield while the air bag is inflated. In doing so, the passenger side tether 492 also pulls the passenger side end portion 428 against the passenger side A-pillar 26.

From the above, those skilled in the art will appreciate that the driver side tether 490 helps maintain the driver side lateral portion 464 positioned adjacent or against the windshield 24, and the passenger side tether 492 helps maintain the passenger side lateral portion 474 positioned adjacent or against the windshield. The tethers 490 and 492 thus help the air bag 400 to conform to the shape or contour of the vehicle 12, particularly the windshield 24. This allows the air bag 400 to be positioned against the windshield 24 and A-pillars 26 of the vehicle 12, which helps ensure that the air bag maintains the desired position relative to the vehicle and provides the desired degree of windshield and A-pillar coverage.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An apparatus for helping to protect a pedestrian from impacts with a vehicle that has a windshield and a hood covering an engine compartment, the apparatus comprising:
   an air bag that is inflatable away from the engine compartment through a space between the hood and the windshield from a stored condition to a deployed condition positioned adjacent the windshield;
   a housing for storing the air bag in a deflated and stowed condition in the engine compartment; and
   a deflector having a portion connected to the housing and a portion for being connected to the vehicle hood, the deflector being adapted to deflect the air bag during inflation and direct the air bag to clear the vehicle hood and to deploy through the space between the hood and the windshield.

2. The apparatus recited in claim 1, wherein the air bag comprises:
   a central portion having a mouth connected to the housing, the mouth receiving inflation fluid from an inflator;
   a driver side lateral portion that extends laterally from the central portion and is adapted to cover a driver side portion of the windshield and a driver side A-pillar of the vehicle; and
   a passenger side lateral portion that extends laterally from the central portion and is adapted to cover a passenger side portion of the windshield and a passenger side A-pillar of the vehicle.

3. The apparatus recited in claim 2, wherein the air bag comprises overlying panels interconnected to define an inflatable volume of the air bag, the air bag further comprising central connections that interconnect the panels to define chambers of the central portion of the air bag, the chambers of the central portion being adapted to direct inflation from the mouth portion through the central portion and into the driver side and passenger side lateral portions of the air bag.

4. The apparatus recited in claim 2, wherein the air bag comprises overlying panels interconnected to define an inflatable volume of the air bag, the air bag further comprising:
   a driver side lateral connection that interconnects the panels to define chambers of the driver side lateral portion; and
   a passenger side lateral connection that interconnects the panels to define chambers of the passenger side lateral portion.

5. The apparatus recited in claim 4, wherein:
   the chambers of the driver side lateral portion comprise an upper chamber and a lower chamber, the chambers being adapted to direct inflation fluid first into the upper chamber, and being adapted such that inflation fluid entering the lower chamber must first flow through the length of the upper chamber; and
   the chambers of the passenger side lateral portion comprise an upper chamber and a lower chamber, the chambers being adapted to direct inflation fluid first into the upper chamber, and being adapted such that inflation fluid entering the lower chamber must first flow through the length of the upper chamber.

6. The apparatus recited in claim 1, wherein the air bag further comprises a central tether having end portions secured to the air bag by connections, the central tether being adapted to pull a central portion of the air bag against the windshield when the air bag is inflated and deployed so that the air bag extends along the angle of inclination of the windshield.

7. The apparatus recited in claim 6, wherein the central tether has a length that is shorter than the distance between the connections, the tether restricting movement of the connections away from each other, the central tether as a result pulling the central portion of the air bag against the windshield.

8. The apparatus recited in claim 6, wherein the air bag comprises overlying panels interconnected at non-inflatable connections that define boundaries of inflatable chambers of the air bag, the connections connecting the central tether to the air bag being positioned within the non-inflatable connections of the air bag.

9. The apparatus recited in claim 1, wherein the air bag further comprises lateral tethers having end portions secured to the air bag by connections, the lateral tethers being adapted to pull lateral portions of the air bag against the windshield when the air bag is inflated and deployed so that the air bag follows the lateral contour of the windshield.

10. The apparatus recited in claim 9, wherein the lateral tethers have lengths that are shorter than the distance between the connections, the tether restricting movement of the connections away from each other, the lateral tethers as a result pulling the lateral portions of the air bag against the windshield.

11. The apparatus recited in claim 9, wherein the air bag comprises overlying panels interconnected at non-inflatable connections that define boundaries of inflatable chambers of the air bag, the connections connecting the lateral tethers to the air bag being positioned within the non-inflatable connections of the air bag.

12. The apparatus recited in claim 1, wherein the deflector comprises an integral portion of the housing and has a portion connected to the vehicle hood.

13. The apparatus recited in claim 12, wherein the deflector comprises a plastic component that is flexible to permit repeated opening and closing of the vehicle hood.

14. The apparatus recited in claim 12, wherein the deflector is adapted to remain connected to the vehicle hood and deflect the protection device when the hood is raised by hood lifters.

15. An apparatus for helping to protect a pedestrian from impacts with a vehicle that has a windshield and a hood covering an engine compartment, the apparatus comprising:
an air bag that is inflatable away from the engine compartment through a space between the hood and the windshield from a stored condition to a deployed condition positioned adjacent the windshield, the air bag when in the deployed condition covering a driver side A-pillar, a passenger side A-pillar, and portions of the windshield extending between the A-pillars, the air bag comprising overlying panels and non-inflatable connections that interconnect the panels to define inflatable chambers of the air bag; and
at least one tether having opposite ends connected to the non-inflatable connections, the at least one tether having a length that is shorter than the distance between the non-inflatable connections the at least one tether thereby restricting relative movement of the portions of the air bag and pulling the air bag against the windshield.

16. The apparatus recited in claim 15, further comprising:
a housing for storing the air bag in a deflated condition, and
a deflector having a portion connected to the housing and a portion for being connected to the vehicle hood, the deflector being adapted to deflect the air bag during inflation and direct the air bag to clear the vehicle hood and to deploy through the space between the hood and the windshield.

17. The apparatus recited in claim 15, wherein the air bag comprises a central portion including central connections that define central chambers of the air bag, the at least one tether comprising a central tether that interconnects different portions of the central connections, the central tether having a length that is shorter than the distance between the central connections, the tether restricting movement of the central connections away from each other and as a result pulling the central portion of the air bag against the windshield.

18. The apparatus recited in claim 15, wherein the air bag further comprises:
a driver side portion including driver side connections that define driver side chambers of the air bag, the at least one tether comprising a driver side tether that interconnects different portions of the driver side connections, the driver side tether having a length that is shorter than the distance between the portions of the driver side connections, the tether restricting movement of the portions of the driver side connections away from each other and as a result pulling the driver side portion of the air bag against the windshield; and
a passenger side portion including passenger side connections that define passenger side chambers of the air bag, the at least one tether comprising a passenger side tether that interconnects different portions of the passenger side connections, the passenger side tether having a length that is shorter than the distance between the portions of the passenger side connections, the tether restricting movement of the portions of the passenger side connections away from each other and as a result pulling the passenger side portion of the air bag against the windshield.

\* \* \* \* \*